United States Patent
Sogah et al.

(10) Patent No.: US 7,902,321 B2
(45) Date of Patent: Mar. 8, 2011

(54) ONE-POT, ONE-STEP IN SITU LIVING POLYMERIZATION FROM SILICATE ANCHORED MULTIFUNCTIONAL INITIATOR

(75) Inventors: Dotsevi Y. Sogah, Ithaca, NY (US); Jianbo Di, Evansville, IN (US)

(73) Assignee: Cornell Research Foundation, Inc., Ithaca, NY (US)

( * ) Notice: Subject to any disclaimer, the term of this patent is extended or adjusted under 35 U.S.C. 154(b) by 690 days.

(21) Appl. No.: 11/665,157

(22) PCT Filed: Nov. 9, 2005

(86) PCT No.: PCT/US2005/040205
§ 371 (c)(1),
(2), (4) Date: Apr. 12, 2007

(87) PCT Pub. No.: WO2006/055301
PCT Pub. Date: May 26, 2006

(65) Prior Publication Data
US 2009/0030174 A1    Jan. 29, 2009

Related U.S. Application Data

(60) Provisional application No. 60/628,191, filed on Nov. 17, 2004.

(51) Int. Cl.
*C08K 3/34* (2006.01)
*C08K 3/20* (2006.01)
*C08G 63/48* (2006.01)
*C08G 63/91* (2006.01)

(52) U.S. Cl. ........................ 528/354; 546/232

(58) Field of Classification Search .................. 528/354; 546/232
See application file for complete search history.

(56) References Cited

U.S. PATENT DOCUMENTS

| | | | |
|---|---|---|---|
| 4,281,087 A | 7/1981 | Heuschen et al. | |
| 6,060,549 A | 5/2000 | Li et al. | |
| 6,225,394 B1 | 5/2001 | Lan et al. | |
| 6,242,500 B1 | 6/2001 | Lan et al. | |
| 6,262,162 B1 | 7/2001 | Lan et al. | |
| 6,407,155 B1 | 6/2002 | Qian et al. | |
| 6,579,927 B1 * | 6/2003 | Fischer | 524/445 |
| 6,624,262 B2 | 9/2003 | Matyjaszewski et al. | |
| 6,627,314 B2 | 9/2003 | Matyjaszewski et al. | |
| 6,642,322 B2 * | 11/2003 | Gagne et al. | 525/411 |
| 6,812,272 B2 | 11/2004 | Fischer | |
| 6,828,370 B2 | 12/2004 | Lan et al. | |
| 6,861,481 B2 * | 3/2005 | Ding et al. | 525/424 |

OTHER PUBLICATIONS

Di, Jianbo, Ph.D., "Nanostructure and architecture control in polymer silicate nanocomposites", Cornell University, 2004, 226 pages; AAT 3114505—Abstract.

* cited by examiner

Primary Examiner — Kelechi C Egwim
(74) Attorney, Agent, or Firm — Hodgson Russ LLP

(57) ABSTRACT

Silicate anchored multifunctional initiator has moiety initiating ring opening living polymerization of lactone or ethylene oxide or cyclic siloxane monomer and other moiety for initiating living free radical polymerization of ethylenically unsaturated monomer. The monomers are reacted with the initiator in a one-pot, one-step reaction to cause living polymerization of both monomers and exfoliation of silicate layers to provide dispersed block copolymer silicate nanocomposite, with the junction of the two blocks being anchored to silicate layer and each block dangling therefrom.

14 Claims, No Drawings

ONE-POT, ONE-STEP IN SITU LIVING POLYMERIZATION FROM SILICATE ANCHORED MULTIFUNCTIONAL INITIATOR

CROSS-REFERENCE TO RELATED APPLICATION

This application is a 371 national phase filing of PCT/US2005/040205, filed 9 Nov. 2005, which claims the benefit of U.S. Provisional Application No. 60/628,191, filed Nov. 17, 2004, the whole of which is incorporated herein by reference.

The invention was made at least in part with United States Government support under National Science Foundation Grant Numbers DMR-0079992, DMR-9632275 and DMR-8314255. The United States has certain rights in the invention.

TECHNICAL FIELD

The invention is directed at dispersed block copolymer silicate nanocomposites.

BACKGROUND OF THE INVENTION

One-step, one-pot method of forming copolymers from monomers that polymerize by different mechanisms by use of a single compound functioning as an initiator for two different living polymerization reactions, are known. See Puts, R. D. and Sogah, D. Y., Macromolecules 30, 7050-7055 (1997); Weimer, M. W., et al, Macromolecules 31, 8425-8428 (1997); Sogah, D. Y., et al, Polymeric Materials Science and Engineering 80, 86-87 (1999); Bielawski, C. W., et al, Journal of the American Chemical Society 122, 12872-12873 (2000); Hawker, C. J., et al, Chemical Reviews (Washington, D.C.) 101, 3661-3688; and Reutenauer, S., et al, Macromolecules 34, 755-760 (2001).

However, heretofore a one-pot reaction for forming dispersed block copolymer silicate nanocomposites, has not been disclosed.

SUMMARY OF THE INVENTION

It has been discovered herein that by anchoring a multifunctional initiator to silicate layers and carrying out simultaneous block polymerizations, dispersed block copolymer silicate nanocomposites can be prepared where the junction of the two blocks is anchored to silicate layer and each block is available for compatibilization functionality.

In one embodiment herein, denoted the first embodiment, there is provided a multifunctional initiator for cation exchange attachment to a nanoclay, comprising a first moiety for initiating ring opening living polymerization of lactone monomers, ethylene oxide monomer or cyclic siloxane monomer, a second moiety for initiating living free radical polymerization of ethylenically unsaturated monomer and a third moiety for attaching to nanoclay by cation exchange.

In another embodiment of the invention herein, denoted the second embodiment, there is provided a nanoclay cation exchanged with the multifunctional initiator of the first embodiment.

In still another embodiment of the invention herein, denoted the third embodiment, there is provided a method for preparing dispersed block copolymer silicate nanocomposite comprising the step of reacting in a one-pot one step reaction a first monomer and a second monomer with an initiator cation exchanged onto a nanoclay for living polymerization of both monomers to attach the resulting block copolymer to silicate layer of the nanoclay, where the monomers do not cross polymerize and where both living polymerizations involve reactive centers that coexist under the reaction conditions, to form dispersed block copolymer silicate nanocomposite with the junction of the two blocks being anchored to a silicate layer and each block dangling therefrom. In one case the nanoclay is cation exchanged with multifunctional initiator of the first embodiment to attach the initiator to a same silicate layer of the nanoclay, the first monomer is a lactone, e.g., ε-caprolactone, ethylene oxide or cyclic siloxane, e.g., cyclo-octamethyltetrasiloxane, and the second monomer is ethylenically unsaturated monomer, e.g., styrene, and the dispersed copolymer silicate nanocomposite comprises, for example, poly(ε-caprolactone) block and polystyrene block with the junction of the two block being anchored to the same silicate layer.

Yet another embodiment of the invention herein, denoted the fourth embodiment, is directed at dispersed block copolymer silicate nanocomposite with a block (a) of polymer from lactone monomer or ethylene oxide monomer or cyclic siloxane monomer (e.g., cyclo-octamethyltetrasiloxane monomer) and a block (b) of polymer from ethylenically unsaturated monomer, with the junction of the two blocks being anchored to a same silicate layer and each block dangling therefrom, the block copolymer having $M_n$ ranging from 2,000 to 200,000, e.g. with the mole ratio of block (a) to block (b) ranging from 3:1 to 1.5:1.

As used herein, the term "nanoclay" means clay having nanometer thickness silicate platelets that can be modified to make clay complexes compatible with organic monomers and polymers.

As used herein, the term "nanocomposite" means composition of nanoclay in a polymer matrix. The term "dispersed" used in the term "dispersed block copolymer silicate nanocomposites" means that silicate platelets of the nanoclay are exfoliated into single silicate layers which are randomly dispersed in a polymer matrix.

As used herein, the term "one-pot" means doing everything at the same time.

$M_n$, $M_w$ and polydispersities herein are determined by gel permeation chromatography using polystyrene standards. In particular, the gel permeation chromatography is carried out in tetrahydrofuran using a Waters HPLC and Ultrastyragel (Waters Associates) columns and both refractive index and UV detectors. Refraction times are converted to polymer molecular weights using a calibration curve built from narrow molecular weight distribution polystyrene standards.

DETAILED DESCRIPTION

We turn now to the first embodiment.

The first moiety of the multifunctional initiator, that is the moiety for the initiating of ring opening living polymerization of lactone monomer or ethylene oxide monomer or cyclic siloxane (e.g., cyclo-octamethyltetrasiloxane monomer) comprises, for example, a single primary alcohol functionality which is convertible to an alkoxide radical, for example, by reaction with AlEt$_3$, which initiates the ring opening polymerization. The second moiety of the multifunctional initiator, which is to initiate living free radical polymerization of ethylenically unsaturated monomer, preferably comprises a secondary benzyl group linked to a nitroxide. The third moiety of the multifunctional initiator, i.e., the moiety for attaching to nanoclay by cation exchange, is preferably a benzyl trimethyl ammonium group.

The multifunctional initiator of the first embodiment is very preferably

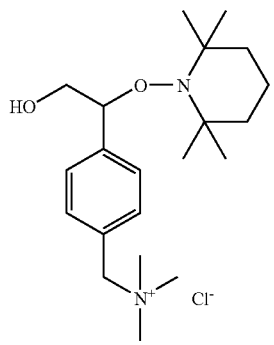
(I)

The compound (I) can be made as described in Working Example I hereinafter; the starting material for the preparation can be made as described in Puts, R. D. and Sogah, D. Y., Macromolecules 30, 7050-7055 (1997).

We turn now to the second embodiment.

Product of the second embodiment can be prepared by cation exchanging nanoclay, e.g., as obtained in the sodium form, only with the composition of the first embodiment. The nanoclay is preferably montmorillonite (a natural clay) or fluorohectorite or laponite (synthetic clays). Other useful nanoclays include bentonites, beidellites, hectorites, saponites, nontronites, sauconites, vermiculites, ledikites, magadiites, kenyaites and stevensites. The nanoclays are normally purchased in the sodium form. Exchanging the sodium with organic cation renders the nanoclay (silicate) more hydrophobic so the nanoclay is more readily swellable in organic media and is thereby more accessible to the monomer and renders the silicate layers more miscible with the copolymer of the nanocomposite which is formed in the third embodiment herein.

Product of the second embodiment can also be obtained by cation exchanging nanoclay partly with multifunctional initiator (I) and partly with non-initiating organic cation, e.g., benzyl trimethyl ammonium chloride, e.g., in a mole ratio of (I) to non-initiating organic cation ranging from 3:1 to 1:5.

Preferably, the composition of the second embodiment is montmorillonite in an inorganic cation form, e.g., montmorillonite in the sodium form, e.g. with a cation exchange capacity of 90 meq/100 gm available from Southern Clay Products, Gonzales, Tex., cation exchanged with multifunctional initiator (I) prepared as described in Working Example (II) hereinafter.

As indicated in the description of the third embodiment herein, nanoclay cation exchanged partly with (I) and partly with benzyl trimethyl ammonium chloride (II), e.g., in a mole ratio of (I) to (II) ranging from 3:1 to 1:5, e.g., 3:1 to 1:3, allows obtaining higher molecular weights without sacrificing strength increase in nanocomposites formed by the method of the third embodiment. The cation exchanged nanoclay is formed the same as where cation exchange is 100% with (I) except that a suitable amount of (II), e.g., a mole ratio of (I) to (II) ranging from 3:1 to 1:5, e.g., an equimolar amount of (II), is substituted for a portion of (I). Cation exchange partly with (I) and partly with (II) is described in Working Example (II) hereinafter.

We turn now to the third embodiment of the invention herein, where dispersed block copolymer silicate nanocomposite with a block of polymer from each of two non-cross polymerizable monomers where both polymerizations involves reactive centers which co-exist under the reaction conditions, are formed. In a special case carried out for exemplification of this method, nanoclay is cation exchanged with multifunctional initiator of the first embodiment and optionally also with the non-initiator benzyl trimethyl ammonium chloride (to decrease the amount of the initiator without decreasing the amount of silicate present), the first monomer is a lactone or ethylene oxide or a cyclic siloxane (e.g., cyclo-octamethyltetrasiloxane), and the second monomer is ethylenically unsaturated monomer, and the copolymer dispersed silicate nanocomposite comprises polylactone (e.g., ε-polycaprolactone, polylactide, or polyglycolide) block or polyethylene oxide block or polydimethylsiloxane block) and poly (ethylenically unsaturated monomer) block with the junction of the two blocks being anchored to the same silicate layer. In one case, the runs carried out involved nanoclay cation exchanged with third moiety of the multifunctional initiator of the first embodiment, where the first moiety of the multifunctional initiator was a single primary alcohol functionality, the second moiety of the multifunctional initiator was a secondary benzyl group linked to a nitroxide and the third moiety of the multifunctional initiator was benzyl trimethyl ammonium chloride, particularly nanoclay cation exchanged with (I), and the first monomer was ε-caprolactone, and the second monomer was styrene. Agent to convert the primary alcohol group of the initiator to alkoxide anion, e.g., $AlEt_3$ in a mole ratio of initiator to $AlEt_3$ of about 1:1, is included in the reaction to provide moiety initiating living ring opening polymerization of the lactone or ethylene oxide or cyclic siloxane monomer, e.g., cyclo-octamethyltetrasiloxane. Preparation of dispersed block copolymer silicate nanocomposite where the blocks are poly(ε-caprolactone) and polystyrene is illustrated in Working Example (III) hereinafter. Reaction is readily carried out, e.g., with molar equivalents of total monomers to initiator ranging, for example, from 100:1 to 3000:1, in $C_5$-$C_{18}$ alkane solvent (hexane is used in Working Example III and is convenient because $AlEt_3$ is available in hexane solution) at a temperature ranging from 75 to 200° C. (the temperature should not be such that the organic solvent is vaporized); 125° C. is used in Working Example III but a range of 120° to 130° C. is useful where hexane is the solvent. It was found that the lesser the amount of initiator relative to monomers, the higher the molecular weight of block copolymer obtained; to obtain high molecular weight without significantly deteriorating from strength advantages, the cation exchange of the nanoclay should be with both initiator, e.g., (I), and non-initiating attaching group, e.g., benzyl trimethyl ammonium chloride (II), e.g., in a mole ratio of (I):(II) ranging from 3:1 to 1:5, e.g. 3:1 to 1:3. See Working Example III and 2a and 3b of Table 1 therein. As indicated in Table 1 of Working Example III, $M_n$ ranging from 2000 to 100,000 with PDIs less than 2.0 are obtained with molecular equivalents of total monomer to initiator ranging from 100:1 to about 2000:1 and $M_n$ ranging from 100,000 to 200,000 with PDI greater than 2.0 are obtained with molar equivalents of total monomers to initiator ranging from about 2000:1 to 3000:1. For example, the molar ratio of ε-caprolactone to styrene ranges from 3:1 to 1:3.

All lactones will work. Preferably, the lactones will be 5- and 7-membered ones, very preferably, ε-caprolactone. Lactides and glycolides are included in the term "lactone" as used herein; these have two lactone groups in their 6-membered structures. Polymerization of these provide poly(lactone) or poly(glycolide), or poly(lactide) or poly(glycolide-co-lactide) blocks. When ethylene oxide is the first monomer, polymerization of it provides a poly(ethylene oxide) block herein.

When cyclo-octamethyltetrasiloxane is the first monomer, polymerization of it provides polydimethylsiloxane block. ε-Caprolactone was used in Working Example III.

The ethylenically unsaturated monomer, can be, for example, selected from the group consisting of styrene, methyl acrylate, tert-butyl acrylate, n-butyl acrylate, 2,2,3,3,3-pentafluoropropyl acrylate and (2-trimethylsilyloxy)-ethyl acrylate. Other suitable ethylenically unsaturated monomers are set forth below. Styrene was used in Working Example III.

The other suitable ethylenically unsaturated monomers include, for example,

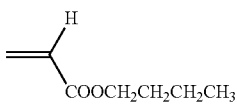
(21)

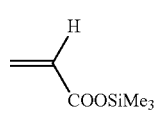
(22)

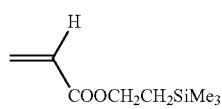
(23)

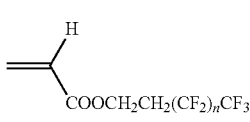
n = 3-5
(24)

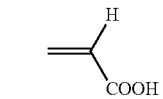
(25)

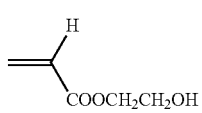
(26)

We turn now to the dispersed block copolymer nanocomposites of the fourth embodiment herein. These have silicate contents ranging, for example, from 0.1 weight percent to 7.5 weight percent and $M_n$ ranging, for example, from 2,000 to 200,000. The nanocomposites have higher dynamic storage modulus and increased chain entanglement than the corresponding block copolymer without silicate. The higher dynamic storage modulus means that the nanocomposites are deformed less than the neat copolymer (no silicate) under the same stress. The increased chain entanglement facilitates load transfer in the material. Silicate contents of 1.0 weight percent or above, are preferred for significant dynamic storage modulus increase compared to control (without silicate). Nanocomposite with block copolymer having $M_n$ greater than 20,000, is preferred to obtain properties of increased storage modulus and decreased plateau modulus. Production of the nanocomposites of the fourth embodiment herein is illustrated in Working Example III.

The invention is illustrated in the following Working Examples.

Working Example (I)

Synthesis of (I)

First the material

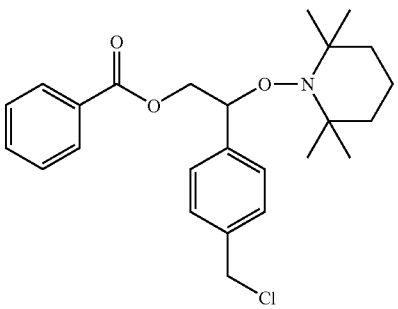
(10)

was prepared as described in Puts, R. D. and Sogah, D. Y., Macromolecules 30, 7050-7055 (1997).

Compound 10 (3.165 g, 7.4 mmol) was dissolved in freshly distilled tetrahydrofuran (THF) (30 mL). Then THF solution of PhMgCl (15 mL, 2.0 M, 30 mmol) was added dropwise. The solution was refluxed for 1.5 hours upon which it turned from red to yellow. It was neutralized by adding 5% HCl aqueous solution dropwise. The solution was extracted with Et$_2$O three times (50 mL×3). The organic phase was dried with Na$_2$SO$_4$ and evaporated using a rotatory evaporator to give solids that were dried in a vacuum oven. $^1$H NMR showed peaks from both 2 and 3 as described below:

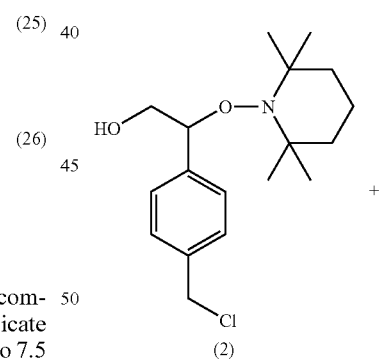
(2)

+

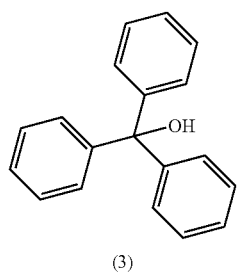
(3)

Without separating 2 from 3, N(CH$_3$)$_3$/EtOH mixture (15.0 mL, 1 M, 15.0 mmol) was added to the solid and the mixture was stirred at room temperature for 16 hours. The excess N(CH$_3$)$_3$/EtOH was removed under vacuum with a secondary trap in line. The solid residue was washed with a mixture of CH$_2$Cl$_2$ and Et$_2$O (5:1, v/v), and filtered and dried. Yield of (I) 2.22 g, 5.8 mmol, 78.2% based on compound (10). $^1$H NMR: δ(CDCl$_3$) 1.10-1.67 (m, 18H), 3.39 (s, 9H), 3.65 (m, 1H), 4.15 (dd, 1H), 5.00 (dd, 2H), 5.25 (dd, 1H), 5.60 (d, 1H), 5.60 (d, 1H), 7.41 (d, 2H), 7.62 (d, 2H).

Working Example II

Preparation of Initiator Modified Silicate

Purified Silicate (1.5 g, 1.35 meq) dispersed in deionized water (200 mL) was poured into a 200 mL solution of the initiator (I) (0.54 g, 1.35 mmol) in ethanol. The mixture was kept stirring at room temperature for 24 hours and filtered. The filter cake was washed with ethanol three times (10 mL×3). The sample was kept under vacuum at 60° C. for 24 hours. The initiator modified silicate was ground into a fine powder before use.

Following the same procedure, 50 molar percentage and 70 molar percentage of the initiator were replaced by benzyl trimethyl ammonium chloride to prepare initiator/non-initiator modified silicate.

Working Example III

Preparation of Nanocomposites

Typical procedure: To a 30 mL three neck round-bottom flask equipped with a stirring bar were added the initiator modified silicate (0.23 g, 0.16 meq initiator), styrene (S) (2.0 mL, 17.5 mmol), hexane solution of AlEt$_3$ (0.052 mL, 1 M, 0.052 mmol) and ε-caprolactone (CL) (2.0 mL, 18.0 mmol). Nitrogen was bubbled into the mixture for 30 minutes. The mixture was stirred at 125° C. under N$_2$ for about 41 hours. When the system was cooled down to room temperature, the contents solidified. The solid was dissolved in CH$_2$Cl$_2$ (7.5 mL) and poured into methanol (10-fold excess) to precipitate the product. The solid was filtered and dried in a vacuum oven to give the product in the form of a white solid.

Amounts, conditions and results are set forth in Table 1 below.

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. A multifunctional initiator compound for cation exchange attachment to a nanoclay, comprising a first moiety for initiation of ring opening living polymerization of lactone monomer or ethylene oxide monomer or cyclic siloxane monomer, a second moiety for initiating living free radical polymerization of ethylenically unsaturated monomer and a third moiety for attaching to nanoclay by cation exchange.

2. The multifunctional initiator of claim 1 where the first moiety is a single primary alcohol functionality, the second moiety is a secondary benzyl group linked to a nitroxide and the third moiety is a benzyl trimethyl ammonium group.

3. The multifunctional initiator of claim 1 which is

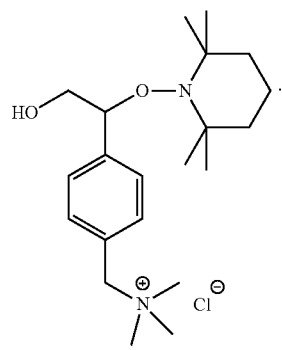

(I)

4. Nanoclay cation exchanged with the multifunctional initiator of claim 1.

5. The cation exchanged nanoclay of claim 4 where the first moiety of the multifunctional initiator comprises a single primary alcohol functionality, the second moiety of the multifunctional initiator comprises a secondary benzyl group

TABLE 1

| Run[a] | S[b] (eq) | CL[b] (eq) | Mn[c] (CAL) ×10$^{-3}$ | Mn[d] (SEC) ×10$^{-3}$ | PDI[d] | Yield (%) | S:Cl[e] From NMR | Silicate[f] Weight % |
|---|---|---|---|---|---|---|---|---|
| 1a | 110 | 110 | 14.9 | 13.8 | 1.41 | 62.6 | 0.35/0.65 | 6.3 |
| 1b | 280 | 280 | 45.4 | 31.2 | 1.32 | 73.1 | 0.29/0.71 | 3.4 |
| 1c | 510 | 520 | 67.1 | 44.3 | 1.56 | 60.2 | 0.37/0.63 | 3.2 |
| 1d | 990 | 1020 | 131.2 | 93.7 | 1.69 | 59.7 | 0.31/0.69 | 0.4 |
| 2a | 1140 | 1180 | 180.2 | 126.5 | 2.69 | 71.5 | 0.37/0.63 | 1.0 |
| 3a | 620 | 640 | 96.7 | 50.2 | 1.63 | 67.8 | 0.35/0.65 | 0.6 |
| 3b | 1380 | 1430 | 191.5 | 113.6 | 2.28 | 62.5 | 0.34/0.66 | 0.2 |

[a]1a-1d. starting with the 100% initiator modified silicate, 2a. starting with 50% initiator and 50% non-initiator modified silicate, 3a and 3b. starting with 30% initiator modified silicate and 70% non-initiator modified silicate.
[b]Molar equivalent of each type of monomer to initiator.
[c]Calculated value based on monomer conversion and equivalent of initiator sites.
[d]Determined by SEC in THF using a Waters HPLC with Ultrastyragel (Waters Associates) columns. Retention times were converted to polymer molecular weights using a calibration curve built from narrow molecular weight distribution polystyrene (PS) standards.
[e]Mole ratio determined by NMR.
[f]Determined by TGA under N$_2$ on a Seiko thermogravimetric differential thermal analyzer using a heating rate of 5.0° C./min.

linked to a nitroxide and the third moiety of the multifunctional initiator is a benzyl trimethyl ammonium group.

6. The cation exchanged nanoclay of claim 5 where the cation exchange is with

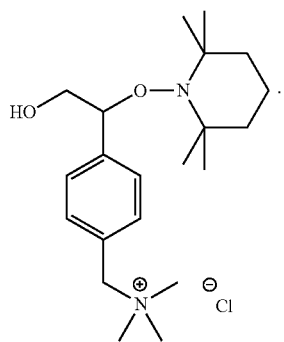

(I)

7. The cation exchanged nanoclay of claim 6 where the cation exchange is only with (I).

8. The cation exchanged nanoclay of claim 6 where the cation exchange is with (I) and also with benzyl trimethyl ammonium chloride, with the molar ratio of (I) to benzyl trimethyl ammonium chloride ranging from 3:1 to 1:5.

9. A method for preparing dispersed block copolymer silicate nanocomposite comprising the step of reacting the cation exchanged nanoclay of claim 4 and first monomer which is lactone monomer or ethylene oxide monomer or cyclic siloxane monomer and second monomer which is ethylenically unsaturated monomer in a one-pot reaction to cause living polymerization of each of the monomers and exfoliation of silicate layers to provide dispersed block copolymer silicate nanocomposite with one block being from living polymerization of lactone or ethylene oxide or cyclic siloxane and other block being from living polymerization of ethylenically unsaturated monomer, with the junction of the two blocks being anchored to the same silicate layer and each dangling therefrom.

10. The method of claim 9 where cation exchanged nanoclay is nanoclay cation exchanged with multifunctional initiator comprising a first moiety comprising a single primary alcohol functionality, a second moiety comprising a secondary benzyl group linked to a nitroxide and a third moiety which is benzyl trimethyl ammonium group.

11. The method of claim 9 where the cation exchanged nanoclay is nanoclay cation exchanged only with (I).

12. The method of claim 11 where the first monomer is .epsilon.-caprolactone and the second monomer is styrene.

13. The method of claim 9 where the cation exchanged nanoclay is nanoclay cation exchanged with (I) and also with benzyl trimethyl ammonium chloride with the molar ratio of (I) to benzyl trimethyl ammonium chloride ranging from 3:1 to 1:5.

14. The method of claim 13 where the first monomer is ϵ-caprolactone and the second monomer is styrene.

* * * * *